Oct. 20, 1925.  1,557,923
W. R. CARROLL
FRICTION JOINT FOR WINDOW ADJUSTERS AND THE LIKE
Filed Dec. 19, 1922
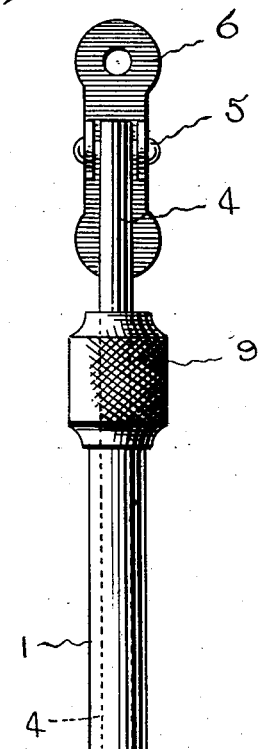
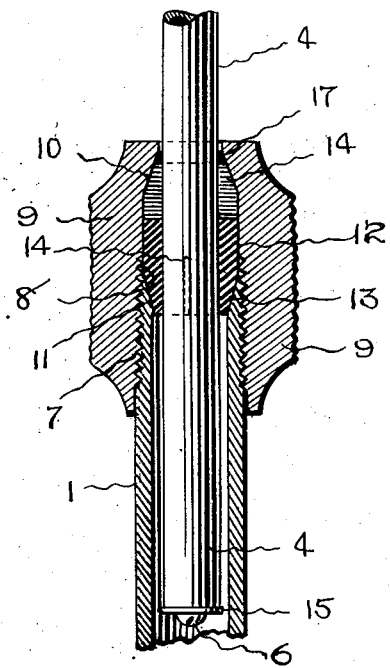
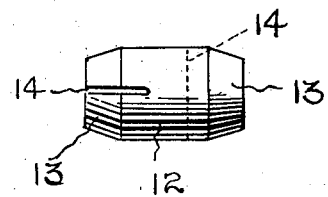
INVENTOR
WILLARD R. CARROLL.
BY
ATTORNEY Patented Oct. 20, 1925.

1,557,923

UNITED STATES PATENT OFFICE.

WILLARD R. CARROLL, OF NEW HAVEN, CONNECTICUT, ASSIGNOR TO THE LYONS MANUFACTURING COMPANY, OF NEW HAVEN, CONNECTICUT, A CORPORATION OF CONNECTICUT.

FRICTION JOINT FOR WINDOW ADJUSTERS AND THE LIKE.

Application filed December 19, 1922. Serial No. 607,842.

*To all whom it may concern:*

Be it known that WILLARD R. CARROLL, a citizen of the United States, and resident of New Haven, in the county of New Haven and State of Connecticut, has invented certain new and useful Improvements in Friction Joints for Window Adjusters and the like, of which the following is a specification.

The present invention relates to window adjusters and the like having two members, one member telescoping into the other, and means being provided to retain the window adjusters in such position that the window or the like is held in the full open or partially opened positions.

The object of the present invention is to improve the previously proposed construction of devices of this class and, in accordance with the invention, an improved friction joint is produced whereby the friction of the joint between the two members may be regulated so as to apply the device successfully in practice to windows and the like of various weights or in other instances when the strain on the device is variable.

The improved device is designed and constructed so that it can be readily adjusted to offer a determinable degree of resistance to retard the sliding movement of one member within the other, or if desired, the device may be tightened to hold the two members in a rigid position.

The improved adjuster is composed of an inner member and an outer member, the inner member telescoping into the outer member, and said members are pivotally connected to brackets, one of which is secured to the window, and the other to a fixed point in the usual manner. A friction joint is interposed between said members which permits of a sliding movement of the inner member within the outer member and the degree of frictional retardation to the sliding movement may be varied by adjustment of an external sleeve threaded on the end of the outer member. The joint includes a bushing loosely mounted on the inner member, and this bushing is rendered elastic or resilient by means of slitted ends to allow contraction of the same when the adjusting device is tightened, and when said adjusting device is loosened, the bushing will be caused to expand by its own physical properties and thereby relieve the friction of the joint as required.

The improved device will be described more fully hereinafter with reference to the accompanying drawings wherein—

Figure 1, is an elevation showing the device as applied to an adjuster for casement windows and the like, Figure 2, is a longitudinal section of the same device considerably enlarged and, Figure 3, is a detail view showing the gripping means of the improved device.

Referring to the aforesaid drawings, the complete device as shown comprises two tubular rod sections, one telescoping into the other. Of these sections, 1 is the outer section, which is connected by a swivel joint 2 to the bracket 3. The other section 4, is pivotally connected at 5 to the bracket 6. The tubular section 1 has the externally threaded end 7 which engages the internal threads 8 of the adjusting sleeve 9. The bore of this sleeve 9 is tapered at 10 and the end of the tube 1 has a similar tapered bore 11. The gripping device or bushing 12 is carried on the tubular rod 4 and is capable of sliding thereon. The ends of the bushing 12 are tapered at 13 and from either end, on diametrically opposite sides, the bushing is slotted at 14 so that the bushing may be contracted under pressure imparted by adjustment of the sleeve 9.

In such instances where it is desired that one section should not be completely withdrawn from the other, the inner section is provided with a stop consisting of a washer 15 which is held on the end of this section by screw 16. In the extreme outward position of the section 4 said stop engages the end of the bushing 12. A washer 17 is interposed between the end of the bushing 12 and the tapered seat 10 in the upper end of the adjusting sleeve 9 so as to provide means to take the wear from the end of the bushing 12.

It has been found in practice that the bushing 12 performs its functions better when it is composed of a non-abrasive metal alloy such for example, as a comparatively hard anti-friction metal which is more or less elastic and may therefore be more readily compressed, and at the same time, when pressure is released, it will return to its original shape.

In the operation of the improved device, as applied to window adjusters or any other instance where one member telescopes within another, the sections are drawn out to the determined position and then if a permanent adjustment is required, the adjusting sleeve is tightened to the full extent so that the tapered ends of the bushing 12 are tightly forced into the correspondingly tapered seats 10 and 11. The bushing 12 is thus compressed so as to tightly engage the rod or tube 4. When it is desired to adjust the sections 1 and 4 so as to slide against retardation, the sleeve is tightened according to the degree of resistance desired and when the joint becomes loose from wear on the bushing, the sleeve 9 may be readjusted to maintain the resistance at the required degree.

It will be noted that one of the chief advantages of the improved device is attained by having both ends of the gripping bushing tapered and engaging their respective seats, so that when the adjusting sleeve is tightened, both ends of the bushing are contracted whereby the gripping surface is considerably increased, and thus a more effectual gripping or binding action is obtained, than heretofore obtained with devices wherein only one end of the gripping device is engaged.

It will be understood, when the requirements can be met with a split bushing having only one end tapered, it would facilitate manufacture if the tapered seat in the end of the tube 1 is eliminated and in this case, the required compression of the bushing would be obtained through engagement of the single tapered end of the bushing with the tapered seat in the sleeve 9.

I claim:

In a device as described, a tubular body; a member adapted to slide within said body; adjustable friction means interposed between said body and member; said means comprising an external nut mounted on a threaded end of said body; a contractible and self-expanding bushing slidably mounted on said member; said bushing having a tapered end engaging a tapered seat whereby contraction of said bushing is effected and means provided on the inner end of said member arranged to engage said bushing to limit the outward movement of said member.

Signed at New Haven, in the county of New Haven, and State of Connecticut this 15th day of December A. D. 1922.

WILLARD R. CARROLL.